United States Patent [19]

Chiari

[11] Patent Number: 5,111,642
[45] Date of Patent: May 12, 1992

[54] MACHINE FOR THE DOSAGE OF POWDERS IN CAPSULES, IN PARTICULAR FOR THE PHARMACEUTICAL INDUSTRY

[75] Inventor: Franco Chiari, Bologna, Italy
[73] Assignee: Macofar S.p.A., Milan, Italy
[21] Appl. No.: 644,807
[22] Filed: Jan. 23, 1991
[51] Int. Cl.⁵ .............................. B65B 63/02
[52] U.S. Cl. ...................... 53/529; 53/900; 141/71; 141/81
[58] Field of Search .............. 141/71, 81; 53/281, 53/282, 283, 529, 560, 900

[56] References Cited

U.S. PATENT DOCUMENTS

| | | | |
|---|---|---|---|
| 3,847,191 | 11/1974 | Aronson | 141/71 X |
| 3,921,681 | 11/1975 | Rebmann et al. | 141/71 |
| 3,978,640 | 9/1976 | Crossley et al. | 53/900 X |
| 4,062,386 | 12/1977 | Zanasi | 53/281 X |
| 4,089,152 | 5/1978 | Zanasi | 53/281 |
| 4,116,247 | 9/1978 | Zanasi | 141/81 X |
| 4,341,244 | 7/1982 | Facchini | 141/71 X |
| 4,501,307 | 2/1985 | Moser et al. | 141/71 X |
| 4,542,835 | 9/1985 | Gamberini | 141/71 X |
| 4,949,766 | 8/1990 | Coatsworth | 141/71 X |

Primary Examiner—Robert L. Spruill
Assistant Examiner—Daniel B. Moon
Attorney, Agent, or Firm—Guido Modiano; Albert Josif

[57] ABSTRACT

The machine comprises a central vertical tube and an outer tube guided on the central tube, these tubes being movable according to constant strokes which are appropriately in step with respect to one another. A casing is fixed to the outer tube and has a lower pipe which is parallel to the tube. A lever is pivoted to a ring positionable longitudinally on the outer tube and a rod is guided in the casing and is provided, in a downward position, with a plunger guided inside the pipe. An adjustable-height loading cell is supported on the central tube, and the lever has an end which is operatively associated with the top of the rod. The opposite end of the lever is free and acts on the loading cell.

4 Claims, 1 Drawing Sheet

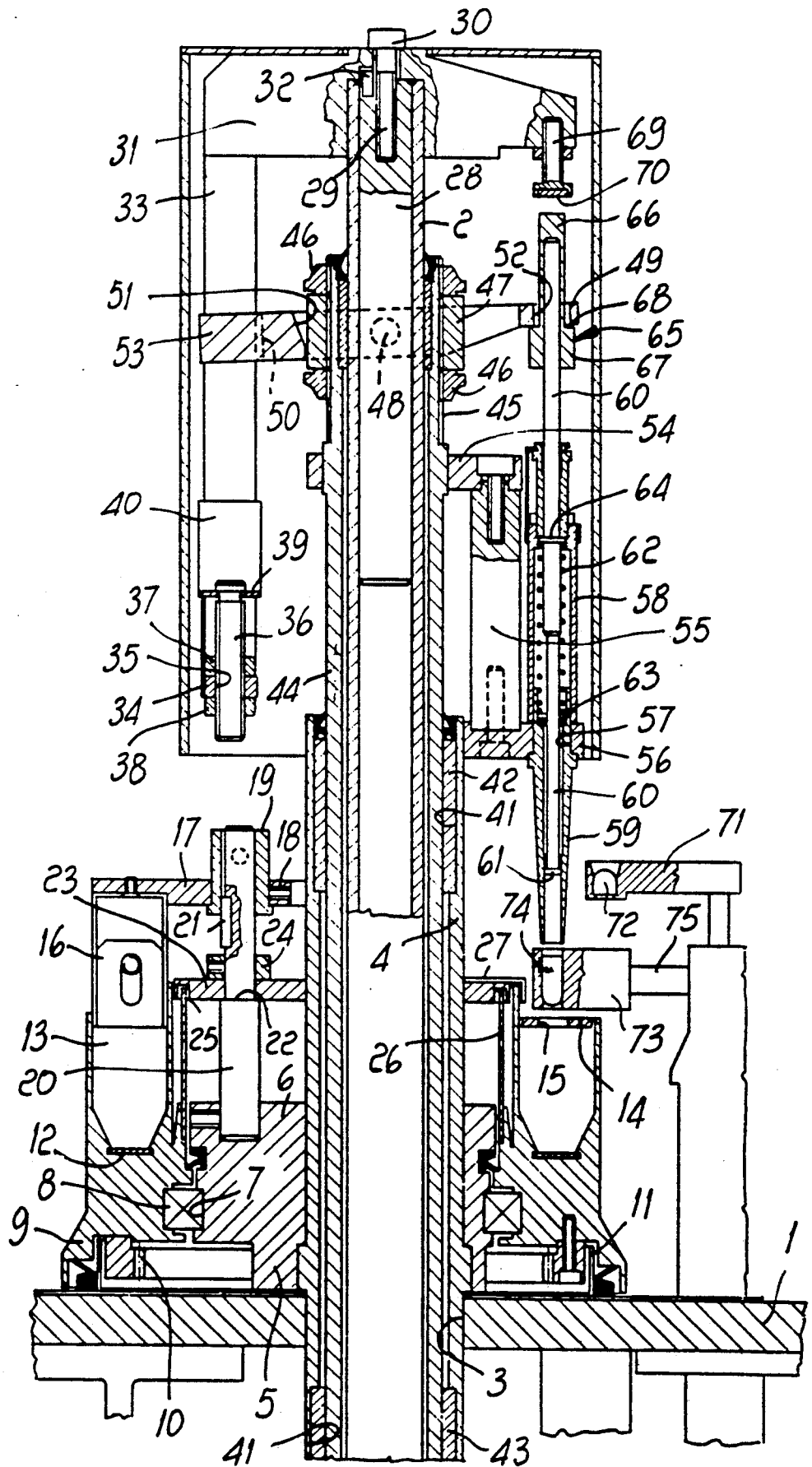

5,111,642

MACHINE FOR THE DOSAGE OF POWDERS IN CAPSULES, IN PARTICULAR FOR THE PHARMACEUTICAL INDUSTRY

BACKGROUND OF THE INVENTION

The present invention relates to a machine for the dosage of powders in capsules, in particular for the pharmaceutical industry.

Current machines for the dosage of powders in capsules substantially have a pipe in which a plunger slides.

The pipe is actuated so as to be sunk into the powder contained in a hopper. While the pipe fills with powder, the plunger descends, compacting the respective amount of powder drawn from the hopper. The disadvantage observed in these machines is due to the fact that the strokes of the pipe and the plunger are constant. In this manner, when the dosage of powders is to be diversified it is necessary to vary the level of the powder in the hopper.

However, this fact does not allow to obtain a compaction force which is proportional to the volume of the tablets, since the stroke of the plunger, by being constant, determines a higher or lower degree of compaction of the powder depending on the amount introduced in the pipe.

SUMMARY OF THE INVENTION

The aim of the present invention is therefore to obviate this disadvantage by providing a machine for the dosage of powders in capsules which provides a powder pressure which is proportional to the required volume.

Within the scope of this aim, an object of the present invention is to provide a dosage machine which is simple in concept, safe and reliable in operation, and which furthermore allows accurate dosage control.

This aim and this object are achieved, according to the invention, by the present machine for the dosage of powders in capsules, characterized in that it comprises a substantially vertical central tube, an outer tube guided on said central tube, said tubes being movable according to constant synchronized strokes, a casing fixed to said outer tube and having a lower pipe parallel to said tube, a lever pivoted to a ring positionable longitudinally on said outer tube, a rod guided in said casing and being provided, at a lower portion thereof, with a plunger guided inside said pipe, means for supporting an adjustable-height loading cell on said central tube, said lever having an end operatively associated with an upper portion of said rod, an opposite end of said lever being free and adapted for acting on said loading cell, actuation means for causing, in succession, a descent stroke of the outer tube so as to cause insertion of the pipe into the powder hopper and the filling thereof with a preset amount of powder, as well as the resting of the free end of the lever on the loading cell, a rising stroke of said central tube for causing descent of the plunger and consequent compaction of the dose of powder contained in the pipe, a rising stroke of the outer tube for raising the pipe to a level which lies above the hopper in alignment with a shell for receiving the compacted dose of powder, and finally a descent stroke of the central tube for moving an adjustable abutment fixed to said central tube, to act on the plunger rod, whereby to expel the compacted dose into the underlying shell.

BRIEF DESCRIPTION OF THE DRAWINGS

The details of the invention will become apparent from the detailed description of a preferred embodiment of a powder dosage machine, illustrated only by way of non-limitative example in the accompanying drawing, wherein:

The FIG. 1 is a sectional elevation view of the machine according to the invention.

DESCRIPTION OF THE PREFERRED EMBODIMENTS

With reference to the above-described figure, the machine comprises a framework provided, in an upward position, with a horizontal table 1. A tube 2 extends vertically from the table through an opening 3 and is actuated upwardly and downwardly along a preset stroke or excursion by cam means which are accommodated below the table 1.

A sleeve 4, centered in the opening 3, is coaxial to the tube 2 and covers said tube for part of its length. The sleeve 4 has a flange 5 which is fixed by means of screws to the table 1.

A cylindrical body 6 is mounted on the flange 5 eccentrically with respect to the sleeve 4, and has a seat 7 for a bearing 8. The bearing 8 supports a bell-shaped element 9 the lower edge whereof skims the table 1.

A crown gear 10 with inward teeth is rigidly associated inside the bell-shaped element 9 and meshes with a pinion which is not illustrated in the drawing. A wall 11 which is fixed to the table extends around the crown gear 10 and prevents the penetration of foreign matter, such as dust.

The annular base 12 of a hopper 13 rests on the upper edge of the bell-shaped element 9; said hopper 13 has the shape of an annular channel closed by a cover 14 which has an opening 15. Due to the eccentricity of the body 6, the hopper 13 is also positioned off-center with respect to the sleeve 4. The level of the powder in the hopper 13 is adjusted by a levelling shutter 16 mounted on an arm 17 fixed by a dowel 18 to a bush 19. The bush 19 slides along a column 20 which rises vertically from the body 6. The bush 19 is guided along the column 20 by a key 21 which prevents its rotation and allows its vertical motion.

Below the bush 19, the column 20 has a shoulder 22 on which a cover 23 rests; said cover is fixed by a ring 24. A circumferential slot 25 is defined in the cover 23, and the upper edge of a cylindrical wall 26 which protects the central region of the hopper 13 from dust is inserted in said slot. An L-shaped element 27 is located on the cover 23 and supports the cover 14 of the hopper 13.

The tube 2 contains, in its upper part, an insert 28 in which a threaded hole 29 is axially defined; a bolt 30 for fixing a coupling element 31 is screwed in said threaded hole. A dowel 32 secures the coupling element 31 against rotational stresses.

The element 31 supports two columns which are parallel with respect to one another and with respect to the tube 2 and extend downward; only the column indicated by the reference numeral 33 is visible in the drawing.

Said two columns 33 are mutually connected by a horizontal bridge 34 which is traversed by a threaded hole 35 in which a screw 36 is screwed. Said screw 36 is fixed by means of a nut 37 and a lock nut 38. A plate 39 is rigidly associated with the upper part of the screw 36, and a loading cell 40 is mounted thereon.

Two internal seats 41 are defined in the sleeve 4 at its opposite ends and accommodate two sleeve bearings 42, 43 which support a sliding tube 44 located at an intermediate position between the sleeve 4 and the tube 2.

In its lower part, the tube 44 is in contact with a cam (not illustrated in the drawing) which, via appropriate conventional motor means, actuates said tube so that it rises and descends according to a preset excursion, as will become apparent hereinafter.

The tube 44 has an upper externally threaded portion 45 on which two rings 46 are screwed; a further ring 47 is slidably arranged between said two rings 46. The ring 47 has two diametrically coaxial pivots 48 on which a flat lever 49 is pivoted, thus defining a rocker. The lever 49 has a substantially rectangular shape and has, on one side, two circular recesses 50 which are engaged by the two columns 33 and a central opening 51 through which the tubes 2 and 44 and the ring 47 pass. The lever has a through hole 52 on the opposite side with respect to the recesses 50. Said lever 49 oscillates about the pivots 48 in a vertical plane, and when the tube 44 is lowered, the tab 53 which is arranged between the recesses 50 strikes against the upper surface of the loading cell 40.

The tube 44 has, below the rings 46, a collar 54 which is rigidly associated therewith and to which a bracket 55 is connected; said bracket is directed downward and is parallel to the tube 44.

The bracket 55 supports, at its lower end, a horizontal ledge 56 which has a through hole 57. A cylindrical casing 58 is centered in the hole 57, and its lower part defines a conical pipe 59.

The inside of the casing 58 is traversed by a rod 60 which is provided, in a downward position, with a plunger 61 and extends upward beyond the casing 58 for a certain length. The plunger 61 is normally kept in raised position by a spring 62 which is accomodated inside the casing 58 and around the rod 60. The spring 62 is compressed between a lower ring 63 and a collar 64 of the rod 60.

The upper end of the rod 60 is inserted in a cap 65 which has the shape of a blind pipe with two portions 66 and 67 which have different outer diameters and define a shoulder 68. The portion 66 passes through the hole 52 of the lever 49, which thus rests on the shoulder 68.

The portion 66 extends upward coaxially with respect to an adjustable abutment 69 which consists of a screw which is screwed in the coupling element 31. The head of the screw has a seat in which a pad 70 made of plastic material is inserted; said pad is suitable for absorbing impacts against the top part of the cap 65 when the coupling element 31 is lowered.

A capsule separation device is mounted on the table 1 proximate to the powder hopper 13 and is formed by an element 71 for separating the cap 72 of the capsule and by an element 73 for supporting the shell 74 of said capsule.

The element 73 is actuated by a jack 75 so as to perform a horizontal reciprocating back-and-forth motion and convey the shell 74 below the pipe 59 in alignment with the hole 15 of the cover 14 which closes the hopper 13.

The operation of the machine for the dosage of powders in capsules can be easily understood from the above description.

The tube 44 is actuated by a cam, which has a preset shape, according to a vertical reciprocating stroke. It is assumed that the tube 44 descends, carrying the bracket 55 with it. In this step, the supporting element 73 of the shell 74 is retracted with respect to the pipe 59 in the position underlying the element 71.

The pipe 59 sinks into the powder of the hopper 13 until its edge makes contact with the bottom of the hopper. In this manner the pipe 59 fills up to the level which corresponds to the level of the powder in the hopper. The flat lever 49 also follows the movement of the tube 44 until the tab 53 abuts against the loading cell 40. As soon as the pipe 59 is in contact with the bottom of the hopper 13, the tube 2 is actuated so as to rise, forcing the lever 49 to oscillate about the pivots 48 due to the lifting of the loading cell 40, which acts from below against the tab 53. The oscillation of the lever 49 causes the descent of the plunger 61 and the compaction of the powder inside the pipe.

Once the powder has been compacted, the tube 2 is again actuated so as to descend, whereas the tube 44 rises and carries the pipe 59 with it up to a level which lies above the level of the upper face of the element 73.

In this manner, the element 73 can be actuated so as to move toward the sleeve 44 until it reaches a position in which the shell 74 is aligned with the pipe 59.

At this point the tube 2 is again actuated so as to descend and, by acting with the abutment 69 on the cap 65, causes the descent of the plunger 61 with respect to the pipe and the expulsion of the compacted powder tablet into the shell 74.

The operating cycle is repeated according to the above described method with the retraction of the element 73 below the element 71 to reconnect the shell to the cap and produce the final capsule.

Obviously, all of the elements of the invention may be substituted by technically equivalent elements.

Furthermore, any materials, shapes and dimensions may be used according to requirements.

I claim:

1. Machine for the dosage of powder in capsules composed of a shell and of a cap associable to said shell, in particular for the pharmaceutical industry, comprising a framework defining a horizontal table, a sleeve vertically fixed on said table, an annular hopper rotatably supported on said sleeve and defining a channel containing the powder to be dosed, a vertical outer tube guided in said sleeve, a central tube guided in said outer tube, a casing fixed to said outer tube and having a lower pipe parallel to said tube, a ring arranged on said outer tube and longitudinally positionable thereon, a lever pivoted to said ring, a rod guided in said casing, a plunger provided, at a lower portion of said rod and guided inside said pipe, means for supporting an adjustable-height loading cell and an adjustable abutment aligned with said rod, said lever having an end operatively associated with an upper portion of said rod, and an opposite end adapted for acting on said loading cell, said outer and central tubes being actuated to carry out, in succession, a descent stroke of the outer tube so as to cause insertion of the pipe into said channel and the filling thereof with a preset amount of powder, as well as the resting of the opposite end of said lever on said loading cell, a rising stroke of the central tube for causing said supporting means to oscillate said lever thus causing descent of the plunger and consequent compaction of the powder contained in the pipe, and formation of a compacted dose of powder inside said pipe, a rising stroke of the outer tube for raising the pipe to a level which lies above said channel in alignment with a shell positioned between said pipe and said channel for receiving the compacted dose of powder, and finally a descent stroke of the central tube for moving said adjustable abutment, to act on the rod of the plunger whereby to expel the compacted dose into the aligned shell.

2. Machine according to claim 1, further comprising a flange provided on said sleeve and fixed by means of screws to said table, a cylindrical body mounted on said flange eccentrically to said sleeve, a bell-shaped element rotatably supported on said body and having a lower edge skimming said table and an upper edge, a crown gear rigidly associated inside said bell-shaped element, said channel having an annular base resting on said upper edge, and a levelling shutter supported on said body for adjusting the level of powder in said channel.

3. Machine according to claim 1, further comprising two columns fixed to said supporting means and parallel with respect to one another and to the central tube and extending downward, a horizontal bridge connecting the lower ends of said columns and an adjustable screw for supporting said loading cell screwed in said bridge, said lever having, at the opposite end, two recesses engaged by said two columns, between which a tab is defined, the loading cell acting on said tab when the central tube is raised, the end of said lever which is opposite to said tab having an engagement hole for the rod of the plunger.

4. Machine according to claim 1, further comprising an externally threaded portion formed on said outer tube, two rings screwed on said externally threaded portion and a further ring slidably arranged between said two rings, said further ring having two diametrically coaxial pivots on which said lever is pivoted in a rocker-like manner.

* * * * *